(12) United States Patent
Piednoel

(10) Patent No.: US 12,136,002 B1
(45) Date of Patent: Nov. 5, 2024

(54) SIMULTANEOUS MULTI-THREADED PROCESSING FOR EXECUTING MULTIPLE WORKLOADS WITH INTERFERENCE PREVENTION

(71) Applicant: MERCEDES-BENZ GROUP AG, Stuttgart (DE)

(72) Inventor: Francois Piednoel, Sunnyvale, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/421,848

(22) Filed: Jan. 24, 2024

(51) Int. Cl.
  *G06F 9/46* (2006.01)
  *G06F 9/52* (2006.01)

(52) U.S. Cl.
  CPC ...................... *G06F 9/52* (2013.01)

(58) Field of Classification Search
  CPC ........................................................ G06F 9/52
  See application file for complete search history.

(56) References Cited

U.S. PATENT DOCUMENTS

| | | | |
|---|---|---|---|
| 10,992,257 B2 | 4/2021 | Narla | |
| 11,386,013 B2 | 7/2022 | Shetty | |
| 11,388,054 B2 | 7/2022 | Bernat | |
| 11,410,266 B2 | 8/2022 | Matam | |
| 11,565,606 B2 | 1/2023 | Kazuno | |
| 11,573,856 B1 | 2/2023 | Ditty | |
| 2019/0391855 A1 | 9/2019 | Bernat | |
| 2020/0017114 A1 | 1/2020 | Santoni et al. | |
| 2022/0114028 A1 | 4/2022 | Peng et al. | |
| 2022/0206846 A1 | 6/2022 | Windh | |
| 2022/0283971 A1 | 9/2022 | Lee | |
| 2023/0017583 A1 | 1/2023 | Shah | |
| 2023/0032305 A1 | 2/2023 | Krishnani | |
| 2023/0036117 A1 | 2/2023 | Krishnani | |
| 2023/0063601 A1 | 3/2023 | Upadhyay | |
| 2023/0185624 A1 | 6/2023 | Yao | |

(Continued)

FOREIGN PATENT DOCUMENTS

| | | |
|---|---|---|
| CN | 110879546 A | 3/2020 |
| CN | 112149369 A | 12/2020 |
| CN | 114780227 A | 7/2022 |

(Continued)

OTHER PUBLICATIONS

Francois Piednoel, Snug Silicon Valley 2023 Keynote, The Standardization Imperative for Chiplets. Mar. 29-30, 2023, Santa Clara, CA. https://www.synopsys.com/community/resources/videos/snug-keynotes.html.

*Primary Examiner* — Gregory A Kessler
(74) *Attorney, Agent, or Firm* — Mahamedi IP Law LLP

(57) ABSTRACT

A system-on-chip can include a data input chiplet to obtain data from one or more data sources. The system-on-chip can further include one or more workload processing chiplets that access the data obtained by the data input chiplet to execute respective workloads. The system-on-chip further includes a central chiplet including a shared memory comprising a reservation table listing a plurality of workload entries. Each respective workload entry can correspond to a specified workload to be executed by the one or more workload processing chiplets. The central chiplet can input a thread number for each respective workload entry in the reservation table, where the thread number identifies a workload pipeline in which the specified workload is to be executed.

18 Claims, 8 Drawing Sheets

(56) References Cited

U.S. PATENT DOCUMENTS

2023/0305993 A1 9/2023 Davis
2023/0325315 A1 10/2023 Dolbeau

FOREIGN PATENT DOCUMENTS

| CN | 115688093 A | 2/2023 |
| GB | 2560708 | 9/2018 |
| KR | 20210015472 A | 2/2021 |

SIMULTANEOUS MULTI-THREADED PROCESSING FOR EXECUTING MULTIPLE WORKLOADS WITH INTERFERENCE PREVENTION

BACKGROUND

Universal Chiplet Interconnect Express (UCIe) provides an open specification for an interconnect and serial bus between chiplets, which enables the production of large system-on-chip (SoC) packages with intermixed components from different silicon manufacturers. It is contemplated that autonomous vehicle computing systems may operate using chiplet arrangements that follow the UCIe specification. One goal of creating such computing systems is to achieve the robust safety integrity levels of other important electrical and electronic (E/E) automotive components of the vehicle.

SUMMARY

Examples described herein involve systems and method of implementing simultaneous multi-threaded processing for executing multiple workloads in multiple parallel pipelines with interference prevention. Such examples can involve any computing environment in which a shared memory or main memory is utilized in connection with multiple processing cores, or multiple chiplets each having multiple processing cores having dedicated cache memory arrangements or cache hierarchies. Such examples can further include a monolithic chip comprising internal processing hardware that utilizes a main memory or shared memory for processing workload tasks. In certain examples, the shared memory can include a reservation table comprising dynamic workload entries that identify workloads, cache addresses for data to be processed in connection with the workloads, dependency information (if any) for each workload, and/or affinity information identifying which hardware component is to execute the workload as a runnable.

In accordance with examples provided herein, the shared memory can be included on a central chiplet comprising a number of processing cores that implement a scheduling program for scheduling the workloads in the reservation table. Such workloads may be executed in a set of parallel pipelines concurrently, which involves precise communication and synchronization between different tasks to avoid interference. For example, a first workload processor may be tasked with executing workloads in one pipeline, while a second workload processor may be tasked with executing workloads in a second pipeline that requires data outputted from the first pipeline. Interference may occur if the second workload processer executes workloads in the second pipeline based on data that has not yet been processed by the first workload processor in the first pipeline.

To prevent these and other types of interferences from occurring while maintaining parallelism, the central chiplet can implement simultaneous multi-threaded processing in the reservation table. In certain examples, each thread may be represented by a thread number and workload pipeline in which various workloads assigned to the thread may be executed as runnables. Based on a compute graph comprising sequences of workloads for execution, the scheduling program can decode a set of programs into individual instruction sets or workloads, and input workload entries corresponding to the instruction sets or workloads into the reservation table (e.g., with workload identifiers, cache addresses, dependency information, affinity information, etc.). According to examples provided herein, the scheduling program can further include a thread number for each workload entry which can identify a particular thread (e.g., workload pipeline or process) in which the workload corresponding to the workload entry is to be executed.

In further implementations, a system-on-chip is described herein that can include a data input chiplet to obtain data from one or more data sources. The system-on-chip can further include one or more workload processing chiplets and a central chiplet including a shared memory comprising a reservation table listing a plurality of workload entries. As provided herein, each workload entry in reservation table can correspond to a specified workload to be executed by the one or more workload processing chiplets.

According to examples described herein, the central chiplet can input a thread number for each respective workload entry in the reservation table. The thread number can identify a specific workload pipeline, from a set of workload pipelines executed by the one or more workload processing chiplets in parallel, in which the specified workload is to be executed. By inputting a thread number for each workload entry in the reservation table, the central chiplet can significantly reduce or eliminate interference in the execution of workloads as runnables in each workload pipeline.

Furthermore, it is contemplated that the use of thread numbers in the reservation table can support the optimization of execution order in the workload processing chiplets, which can reduce processing time and reduce energy consumption in the computing environment (e.g., saving ~200 watts for system-on-chip arrangements utilizing UCIe specification). For autonomous vehicle implementations, these optimizations can contribute to increasing the range of the vehicles (e.g., battery powered vehicles), which can promote climate change mitigation.

In various examples, certain workload entries can include dependency information that must be satisfied before an instruction step or workload corresponding to the workload entry can be executed. This dependency information can correspond to workloads that must executed before a workload corresponding to the workload entry can be executed. As an example, the data input chiplet can acquire data from one or more data sources (e.g., the sensors of an autonomous vehicle). The workload processing chiplets may execute workloads based on the acquired data in one or more sequences represented by one or more parallel pipelines. For autonomous vehicle implementations, these parallel sequences can involve a workload that stitches the sensor data and another workload that fuses the sensor data (e.g., combines LIDAR, radar, and image data). The sequences can further include a set of workloads that perform inference operations on the sensor data (e.g., identify and classify objects in the fused sensor data). Each of these parallel sequences can correspond to workload entries in the reservation that each have dependency information indicating whether the workload is ready for execution in a respective pipeline by a specified workload processing chiplet.

As such, the reservation table updates the dependency information for each of the workload entries as runnables are executed by the workload processing chiplets. As provided herein, the workload processing chiplets can execute runnables in a plurality of workload pipelines in parallel (e.g., independently and/or simultaneously). Thus, each workload pipeline can comprise any number of workloads tagged with a thread number identifying the workload pipeline such that no interference between workload pipelines is possible.

In certain implementations, the central chiplet and/or workload processing chiplets can elect or group workload entries in the reservation table based on the thread number associated with each workload pipeline. In further implementations, the workload processing chiplets and/or central chiplet can further link the dependency information of workload entries in the reservation table having the thread number associated with each workload pipeline. Therefore, the workload pipeline and thread number are linked such that the runnables associated with a particular thread number are always executed in the same workload pipeline.

In accordance with examples described herein, a workload processing chiplet can execute workloads in a plurality of workload pipelines when the dependency information for each of the workloads is satisfied. When the dependency information for a particular workload entry has not been satisfied, the workload processing chiplet can buffer the workload associated with the particular workload entry in an out-of-order buffer until the dependency information has been satisfied (e.g., dependent workloads have been executed).

Certain embodiments described herein may be implemented on a multiple system-on-chip (mSoC), a single system-on-chip (SoC), or a monolithic chip for purposes of autonomous vehicle operation. Further description of mSoC embodiments for vehicle computing is provided in U.S. patent application Ser. No. 18/195,776, which is hereby incorporated by reference in its entirety. In mSoC or SoC embodiments, each system-on-chip can include the sensor data input chiplet, central chiplet, at least one autonomous drive chiplet, at least one general compute chiplet, and at least one machine learning (ML) accelerator chiplet. Further embodiments can include a multiple-system-on-chip arrangement that includes at least two systems-on-chip, with each system-on-chip including a sensor data input chiplet, a central chiplet, and one or more workload processing chiplets (e.g., general compute chiplet(s), autonomous drive chiplet(s), machine learning accelerator chiplet(s), etc.). In such an arrangement, a primary system-on-chip can function to execute workloads in workload pipelines, as described herein, and a backup system-on-chip can operate to perform health monitoring on the primary system-on-chip. When one or more operative parameters of the primary system-on-chip exceeds nominal thresholds (e.g., temperature thresholds, performance thresholds, etc.), the backup system-on-chip can take over the primary functions as the primary system-on-chip, and the primary system-on-chip can revert to a backup health monitoring role.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
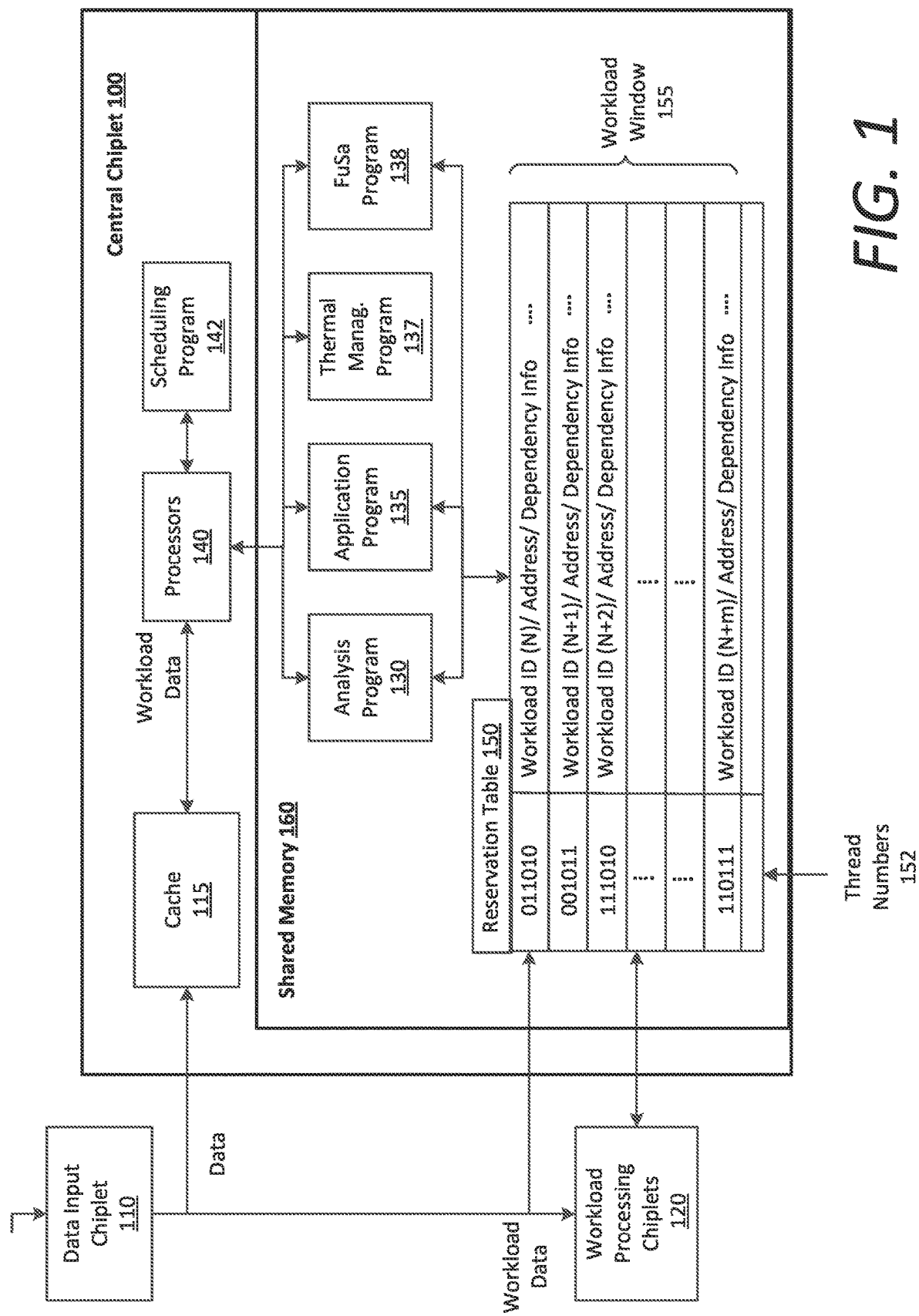
FIG. 1 is a block diagram illustrating an example central chiplet of an SoC arrangement for implementing workload execution using thread numbers, in accordance with examples described herein.

In shared memory computing environments in which data can be cached and processed by multiple processing cores in parallel, interference between workload pipelines or processes executing in parallel may occur when a thread is not explicitly indicated for a particular workload. For example, a processing core performing out-of-order execution of runnables in multiple independent pipelines can monitor a reservation table for available workloads. Based on information in the reservation table, such as workload identifiers, workload dependency, and cache addresses, the processing core may obtain data from a particular cache address and execute a workload on the data as a runnable (e.g., perform ML inference on the data) in one of its workload pipelines, even though the data is meant to be processed in a different workload pipeline, whether by the same processing core or a different processing core. Accordingly, given the processing speeds of UCIe systems, even when the processing core identifies a correct workload identifier and cache address, and even when the dependency for a particular workload has been satisfied, workloads may still be processed in incorrect pipelines executing in parallel, resulting in interference between workload pipelines.

As provided herein, a scheduling program can be implemented to organize each workload entry in the reservation table to include a thread identifier or thread number that specifies to which particular workload pipeline or process the workload entry is assigned. In doing so, workload processing resources (e.g., processing cores and/or chiplets) can link their workload pipelines and/or processes to dedicated thread numbers, which can identify workload entries in the reservation table that the individual workload processing resources can reference to ensure correct workload execution in correct pipelines. Examples described herein can be implemented for any shared memory computing environment that utilizes a reservation table listing workloads for execution by multiple processing resources. Such computing environments can include datacenters, cloud computing platforms, application-based computing systems, robotics computing systems, artificial intelligence platforms, autonomous vehicle platforms, and the like. Such computing environments can also involve systems-on-chip, multiple-systems-on-chip, or monolithic chips disposed in any computing device, such as servers, personal computers, mobile computing devices, and the like.

For autonomous vehicle implementations, the vehicle computing system, comprising an SoC or mSoC computing system, processes sensor data (e.g., images, LIDAR data, radar data, etc.) to perform the various perception, object detection and classification, scene understanding, motion prediction, and/or ML inference tasks. In accordance with examples described herein, an SoC or mSoC can execute workloads for autonomous driving tasks using dynamic scheduling of individual workloads using a reservation table implemented in a shared memory of the SoC or mSoC. In various aspects, each SoC can comprise multiple chiplets for performing autonomous driving tasks. The SoC can include a central chiplet comprising the shared memory and reservation table where information corresponding to workloads (e.g., workload entries) are inputted. The SoC can include a sensor data input chiplet that obtains sensor data from the vehicle sensor system, which can include any combination of cameras, LIDAR sensors, radar sensors, ultrasonic sensors, proximity sensors, and the like.

Upon obtaining each item of sensor data (e.g., individual images, point clouds, radar pulses, etc.), the sensor data input chiplet can indicate availability of the sensor data in the reservation table, store the sensor data in a cache, and indicate the address of the sensor data in the cache. Through execution of workloads in accordance with a set of independent pipelines, a set of workload processing chiplets can monitor the reservation table for available workloads. As provided herein, the central chiplet can input and manage workload entries the reservation table (e.g., via a scheduling program) and can input a thread number for each workload entry, which identifies in which particular workload pipeline or process the workload is to be executed.

When workloads are completed by the chiplets, dependency information for additional workloads in the reservation table can be updated by the central chiplet to indicate so, and the additional workloads can become available for execution in the reservation table when no dependencies exist. In certain examples, the chiplets can monitor the reservation table by way of a workload window and instruction pointer arrangement, in which entries of the reservation table may sequentially analyzed along the workload window by the workload processing chiplets. If a particular workload having a thread number corresponding to a workload pipeline of the workload processing chiplet is ready for execution (e.g., all dependencies are resolved), the workload processing chiplets can execute the workload in its relevant pipeline accordingly.

As such, the reservation table can be implemented as an out-of-order buffer referencing thread numbers, where workloads assigned to specified workload pipelines or processes are held until all dependencies for each individual workload are resolved. Accordingly, the chiplets can perform out-of-order execution on workloads that correspond to the sensor data stored in a shared cache in a set of independent pipelines that may be certified based on their deterministic nature. As provided herein, the use of thread numbers in workload entries can optimize the execution order of workloads and significantly reduce or eliminate workload processing interference, further facilitating in autonomous vehicle computing system certification.

As provided herein, a workload "pipeline," "thread," or "process" may be used interchangeably, and may refer to sequences of workloads associated with the same thread number that are to be executed in the same workload pipeline, thread, or process. As further provided herein, a particular pipeline, thread, or process comprising a sequence of workloads can be executed by multiple hardware components, such as a transient-resistant core of a central chiplet at a first frequency (e.g., on the order of microseconds) and a high-performance core in a general compute chiplet at a second frequency (e.g., on the order of nanoseconds). In further implementations, each workload processing core of each chiplet can execute runnables comprising multiple workloads in multiple workload pipelines, threads, or processes in parallel. As such, a processing core of a particular chiplet may reference multiple thread numbers in the reservation table for workloads to be executed in matching pipelines, threads, or processes handled by that processing core.

In certain implementations, example computing systems described herein can perform one or more functions described herein using a learning-based approach, such as by executing an artificial neural network (e.g., a recurrent neural network, convolutional neural network, etc.) or one or more machine-learning models. Such learning-based approaches can further correspond to the computing system storing or including one or more machine-learned models. In an embodiment, the machine-learned models may include an unsupervised learning model. In an embodiment, the machine-learned models may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

As provided herein, a "network" or "one or more networks" can comprise any type of network or combination of networks that allows for communication between devices. In an embodiment, the network may include one or more of a local area network, wide area network, the Internet, secure network, cellular network, mesh network, peer-to-peer communication link or some combination thereof and may include any number of wired or wireless links. Communication over the network(s) may be accomplished, for instance, via a network interface using any type of protocol, protection scheme, encoding, format, packaging, etc.

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic. In some examples, a computing "apparatus" can comprise a computing system, such as a system of one or more servers, or an on-board, autonomous vehicle computing system. In variations, a computing apparatus can comprise a computing device, such as computing resources included on a circuit board, personal computer, smartphone computer, tablet computer, laptop, and the like.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers and/or personal computers using network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on personal computers or servers. Other examples of computer storage mediums include portable storage units, such as flash memory or magnetic memory. Computers, terminals, network-enabled devices are all examples of machines and devices that utilize processors, memory, and instructions stored on computer-readable mediums. Additionally, examples may be implemented in the form of computer programs, or a computer usable carrier medium capable of carrying such a program.

In some embodiments, a computing system implementing the processes described herein can include one or more control circuits that may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), systems on chip (SoCs), or any other control circuit. In some implementations, the control circuit(s) and/or computing system may be part of, or may form, a vehicle control unit (also referred to as a vehicle controller) that is embedded or otherwise disposed in a vehicle (e.g., a Mercedes-Benz® car, truck, or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, an autonomous vehicle control system, or any other controller (the term "or" may be used herein interchangeably with "and/or").

In an embodiment, the control circuit(s) may be programmed by one or more computer-readable or computer-executable instructions stored on the non-transitory computer-readable medium. The non-transitory computer-readable medium may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, for example, a computer diskette, a hard disk drive (HDD), a solid-state drive (SDD) or solid state integrated memory, a random access memory (RAM), a read-only memory (ROM), an erasable programmable read-only memory (EPROM or Flash memory), a static random access memory (SRAM), and/or dynamic random access memory (DRAM). In some cases, the non-transitory computer-readable medium may store computer-executable instructions or computer-readable instructions, such as instructions to perform the methods described throughout the present disclosure.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit to perform one or more functional tasks. The modules and computer-readable/executable instructions may be described as performing various operations or tasks when the control circuit(s) or other hardware components execute the modules or computer-readable instructions.

In further embodiments, the computing system can include a communication interface that enables communications over one or more networks to transmit and receive data. In various examples, the computing system can communicate, over the one or more networks, with fleet vehicles using the communication interface to receive sensor data and implement the intersection classification methods described throughout the present disclosure. In certain embodiments, the communication interface may be used to communicate with one or more other systems. The communication interface may include any circuits, components, software, etc. for communicating via one or more networks (e.g., a local area network, wide area network, the Internet, secure network, cellular network, mesh network, and/or peer-to-peer communication link). In some implementations, the communication interface may include for example, one or more of a communications controller, receiver, transceiver, transmitter, port, conductors, software and/or hardware for communicating data/information.

As an example embodiment, the control circuit(s) of the computing system can include a SoC arrangement that facilitates the various methods and techniques described throughout the present disclosure. In various examples, the SoC can include a set of chiplets, including a central chiplet comprising a shared memory in which a reservation table is utilized to execute various autonomous driving workloads in an out-of-order manner, as described herein.

System Description

FIG. 1 is a block diagram illustrating an example central chiplet 100 of an SoC arrangement for implementing workload execution, in accordance with examples described herein. Referring to FIG. 1, the central chiplet 100 can include a shared memory 160 storing an analysis program 130 and an application program 135. As provided herein, the analysis program 130 can comprise a set of instructions for executing analysis workloads in independent pipelines. The data analysis workloads can comprise data acquisition, data fusion, data matching and/or analysis, and/or ML inference tasks for sorting and processing the data provided by a data input chiplet 110 of the SoC.

In the field of autonomous vehicles, the data analysis workloads can comprise reflex workloads involving sensor data fusion (e.g., LIDAR, radar, and image data fusion), scene understanding, and ML inference of the surrounding environment of the vehicle. These tasks can comprise two-dimensional image processing, sensor fused data processing (e.g., three-dimensional LIDAR, radar, and image fusion data), neural radiance field (NeRF) scene reconstruction, occupancy grid determination, object detection and classification, motion prediction, and other scene understanding tasks for autonomous vehicle operation.

As further provided herein, the application program 135 can comprise a set of instructions for operating the vehicle controls of the autonomous vehicle based on the output of the workload pipelines. For example, the application program 135 can be executed by one or more processors 140 of the central chiplet 100 and/or one or more of the workload processing chiplets 120 to dynamically generate a motion plan for the vehicle based on the execution of the reflex workloads, and operate the vehicle's controls (e.g., acceleration, braking, steering, and signaling systems) to execute the motion plan accordingly.

In various implementations, the central chiplet 100 can include a set of one or more processors 140 (e.g., a transient-resistant CPU and general compute CPUs) that can execute a scheduling program 142 for execution of workloads as runnables in independent pipelines (e.g., in accordance with the compute task and data positioning optimizations). In certain examples, one or more of the processors 140 can execute reflex workloads in accordance with the analysis program 130 and/or application workloads in accordance with the application program 135. As such, the processors 140 of the central chiplet 100 can reference, monitor, and update dependency information in workload entries of the reservation table 150 as workloads become available and are executed accordingly. For example, when a workload is executed by a particular chiplet, the chiplet updates the dependency information of other workloads in the reservation table 150 to indicate that the workload has been completed. This can include changing a bitwise operator or binary value representing the workload (e.g., from 0 to 1) to indicate in the reservation table 150 that the workload has been completed. Accordingly, the dependency information for all workloads having dependency on the completed workload is updated accordingly.

In embodiments described herein, the scheduling program 142 and reservation table 150 can be configured based on the compute task and data positioning optimizations. For example, based on an optimized compute graph and an optimized data positioning graph-indicating which cache addresses raw and processed sensor data are to be positioned and accessed, as well as which workload processing components are to execute the individual workloads when available—the scheduling program 142 can schedule the workload IDs in reservation table 150 for execution as runnables by configuring the dependency information, address information (e.g., cache or memory location of where to access sensor data for executing the runnable), and affinity information (e.g., the specific processing component to execute the runnable).

In particular, the scheduling program 142 can decode the each of the data analysis program 130, the application program 135, thermal management program 137, and functional safety (FuSa) program 138 into individual instruction sets and schedule each instruction set in the reservation table 150 as a workload entry comprising a workload identifier and thread number 152. As provided herein, the workload entry can comprise a 64-bit or 128-bit entry (or higher bit implementations) comprising all information needed for a workload processor or workload processing chiplet 120 to execute the workload. As further provided herein, the thread number 152 can comprise one or more bits of the workload entry that identify the thread or pipeline in which the workload is to be executed.

In accordance with examples described herein, the scheduling program 142 inputs a thread number 152 for each workload entry in the reservation table 150 to identify a specific workload pipeline or process to which the workload is assigned. As provided herein, each workload processing chiplet 120 can simultaneously execute runnables in any number of independent pipelines or threads. As shown in FIG. 1, each workload entry in the reservation includes a thread number 152 that identifies in which particular pipeline or thread the workload is to be executed. As each processing core of each workload processing chiplet 120 references the reservation table 150 (e.g., using instruction pointer, workload window 155, and out-of-order buffer methods), the processing core can only reference workload entries having thread numbers 152 that match the workload pipelines and/or processes executed by that particular processing core.

According to examples described herein, the reservation table 150 can include workload entries, each of which indicates a workload identifier that describes the workload to be performed, an address in the cache memory 115 and/or HBM-RAM of the location of raw or processed sensor data required for executing the workload, any dependency information corresponding to dependencies that need to be resolved prior to executing a runnable corresponding to the workload, and/or affinity information specifying which hardware component is to execute the runnable when the set of workloads corresponding to the runnable is available (e.g., when all dependencies are met for each of the workloads). In certain aspects, the dependencies can correspond to other workloads that need to be executed. Once the dependencies for a particular workload are resolved, the workload entry can be updated (e.g., by the chiplet executing the dependent workloads, or by the processors 140 of the central chiplet 100 through execution of the scheduling program 142). When no dependencies exist for a particular workload as referenced in the reservation table 150, the workload can be executed in the assigned pipeline or process, as defined by the thread number 152, by a corresponding workload processing chiplet 120.

In autonomous vehicle implementations, the data input chiplet 110 obtains sensor data from the sensor system of the vehicle, and can store the sensor data (e.g., image data, LIDAR data, radar data, ultrasonic data, etc.) in a cache 115 of the central chiplet 100. The sensor data input chiplet 110 and/or scheduling program 142 can generate workload entries for the reservation table 150 comprising thread numbers 152, workload identifiers for the sensor data (e.g., an identifier for each obtained image from various cameras of the vehicle's sensor system), and an address of the sensor data in the cache memory 115. An initial set of workloads can be executed on the sensor data by the processors 140 of the central chiplet 100 and/or workload processing chiplets 120, which can update the reservation table 150 to indicate that the initial set of workloads have been completed.

As described herein, the workload processing chiplets 120 monitor the reservation table 150 to determine whether particular workloads in their respective pipelines are ready for execution. As an example, the workload processing chiplets 120 elect or group workload entries in the reservation table 150 based on thread number 152, and can continuously monitor the elected or grouped workload entries in the reservation table 150 using a workload window 155 (e.g., an instruction window for multimedia data) in which a pointer can sequentially read through each workload entry to determine whether the workloads have any unresolved dependencies. If one or more dependencies still exist in the workload entry, the pointer progresses to the next entry without the workload being executed. However, if the workload entry indicates that all dependencies have been resolved (e.g., all workloads upon which the particular workload depends have been executed), then the relevant workload processing chiplet 120 and/or processors 140 of the central chiplet 100 can execute the workload accordingly.

As such, the workloads are executed in an out-of-order manner where certain workloads are buffered until their dependencies are resolved. Accordingly, to facilitate out-of-order execution of workloads, the reservation table 150 comprises an out-of-order buffer (e.g., for each thread) that enables the workload processing chiplets 120 to execute the workloads in an order governed by the resolution of their dependencies in a deterministic manner. It is contemplated that out-of-order execution of workloads in the manner described herein can increase speed, increase power efficiency, and decrease complexity in the overall execution of the workloads. Furthermore, grouping workloads in the reservation table 150 based on thread number 152 can support the optimization of execution order in the workload processing chiplets 120. For autonomous vehicle implementations, in addition to reducing processing time and energy consumption in the vehicle computing system (e.g., a multiple-system-on-chip arrangement), these optimizations can contribute to increasing the range of the autonomous vehicles, thereby promoting climate change mitigation.

Furthermore, it is contemplated that the use of simultaneous multi-threading for processing resources, as described herein, provides for increased computing performance based on a given transistor count. For example, transistors that would otherwise be stalled or awaiting a processing instruction can be utilized to perform parallel processing on a thread level as well as instruction level using thread numbers and parallel pipelines to ensure the most efficient use of the transistors in the various computing environments described here. As such, the examples described herein optimize transistor usage in various computing systems and have the effect of reducing material and resource waste in semiconductor manufacturing processes.

For example, one particular problem observed in the field of semiconductor manufacturing is the excessive need for water in semiconductor fabrication plants (e.g., cooling water for equipment and HVAC systems, ultrapure water to rinse microchips during manufacture, etc.). The water footprint and energy footprint of semiconductor fabrication plants (which, in the United States, are typically in water-scarce locations) are significant contributors to greenhouse gas emissions and ever-increasing water scarcity. The implementation of simultaneous multi-threading on computing environments using shared memory (e.g., systems-on-chip comprising multiple chiplets, multiple systems-on-chip, monolithic chips, etc.) results in less silicon space required for similar computing performance of computing systems that do not implement simultaneous multi-threading. This results in more efficient transistor usage, more computing performance per given wafer space, and less water, mineral resource, and energy usage in the manufacturing of such computing systems.

As described herein, the workload processing chiplets 120 can execute workloads in each pipeline in a deterministic manner, such that successive workloads of the pipeline are dependent on the output of preceding workloads in the pipeline. In various implementations, the processors 140 and workload processing chiplets 120 can execute multiple independent workload pipelines in parallel, with each workload pipeline including a plurality of workloads to be executed in a deterministic manner. Each workload pipeline can provide sequential output (e.g., for other workload pipelines or for processing by the application program 135 for autonomously operating the vehicle). Through concurrent execution of the reflex workloads in deterministic pipelines, the application program 135 can autonomously operate the controls of the vehicle along a travel route.

As provided herein, the use of the workload window 155 and reservation table 150 referencing dependency information for workloads enables the workload processing chiplets 120 to operate more efficiently by performing out-of-order execution on the workloads and referencing thread numbers 152 identifying their corresponding workload pipelines. For example, instead of performing inference operations on images based on when they are available, a workload processing chiplet 120 can group workload entries for a first pipeline in the reservation table 150 based on the thread number 152 for the first pipeline, and execute relevant workloads in the first pipeline by, for example, initially acquiring all images from all cameras first, then stitching the images to for a 360 degree ribbon of the surrounding environment of the vehicle, and then performing inference on all the images as stitched together. Simultaneously, the workload processing chiplet 120 can execute relevant workloads in a second pipeline by grouping workload entries in the reservation table 150 based on the thread number 152 associated with the second pipeline, and executing the workloads in the second pipeline when their respective dependencies are met. Accordingly, the workload processing chiplet 120 can execute workloads in a plurality of pipelines in parallel with significantly reduced complexity, increased speed, and reduced power requirements.

In further examples, the shared memory 160 can include a thermal management program 137 executable by the one or more processors 140 to manage the various temperatures of the SoC, operate cooling components, perform hardware throttling, switch to backup components (e.g., a backup SoC), and the like. In still further examples, the shared memory 160 can include a FuSa program 138 that performs functional safety tasks for the SoC, such as monitoring communications within the SoC (e.g., using error correction code), comparing output of different pipelines, and monitoring hardware performance of the SoC.

As with the analysis program 130 and the application program 135, the scheduling program 142 can decode the thermal management program 137 and the FuSa program 138 to identify individual instruction sets or workloads to be executed in independent pipelines by the processors 140 of the central chiplet 100 and/or the workload processing chiplets 120. The scheduling program 142 can further input workload entries for each of the instruction sets or workloads of the thermal management program 137 and FuSa program 138 into the reservation table 150, with each workload entry including a thread number 152 identifying in which particular pipeline or thread the workload is to be executed.

According to examples described herein, the thermal management program 137 and FuSa program 138 can perform their respective tasks in independent pipelines each associated with a particular thread number 152. For example, FuSa tasks can be executed in a FuSa pipeline that can acquire and compare outputs of multiple workload pipelines to ensure they are consistent. In some examples, the FuSa program 138 can also reference the reservation table 150 for FuSa workloads that correspond to these tasks. As provided herein, the FuSa program 138 can identify workload entries in the reservation table 150 based on thread numbers 152 associated with the FuSa pipelines.

Example System-on-Chip

Figure 2:
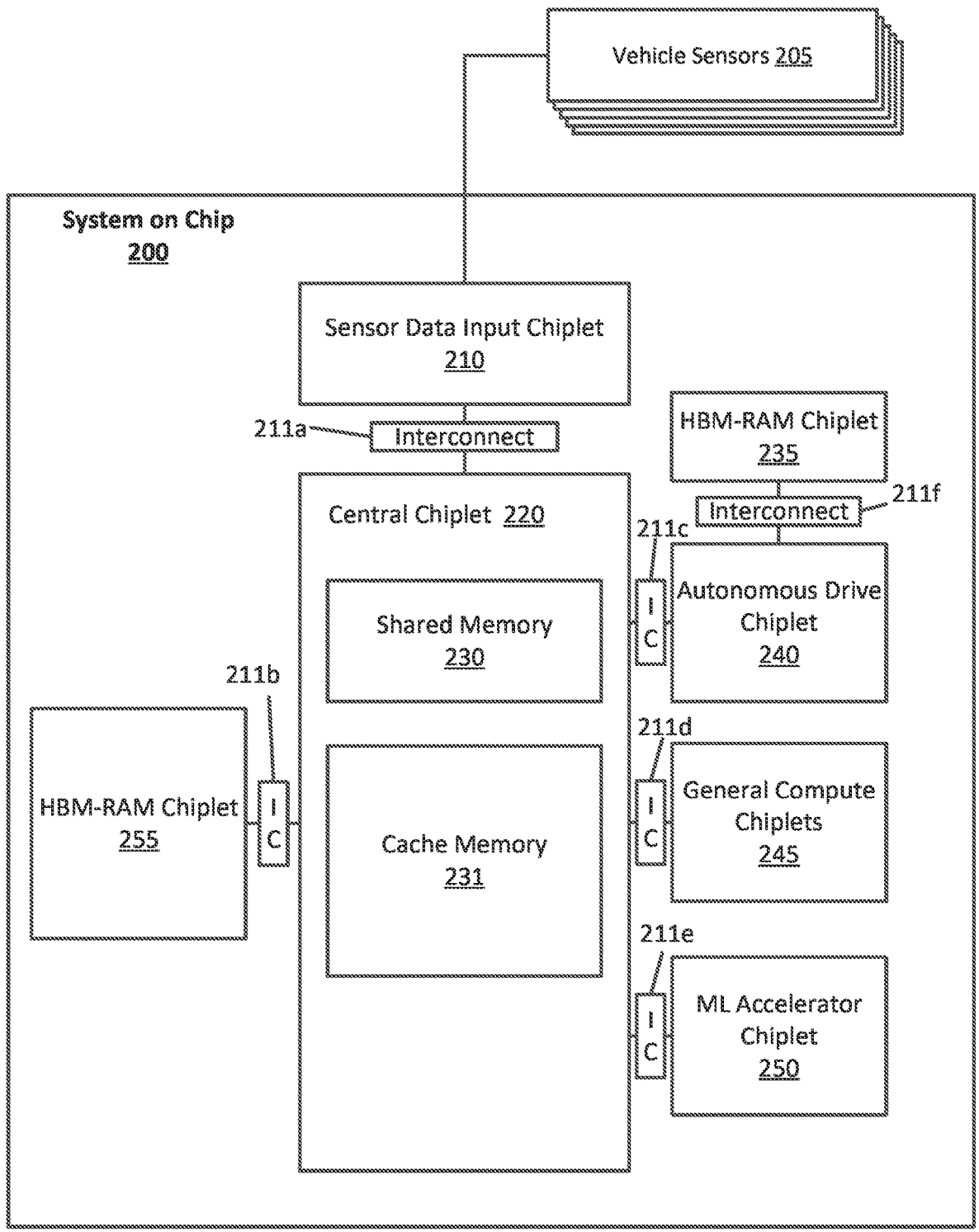
FIG. 2 is a block diagram depicting a system-on-chip (SoC) in which examples described herein may be implemented, in accordance with examples described herein.

FIG. 2 is a block diagram illustrating an example system-on-chip (SoC) 200, in accordance with examples described herein. The example SoC 200 shown in FIG. 2 can include additional components, and the components of the SoC 200 may be arranged in various alternative configurations other than the example shown. Thus, the SoC 200 of FIG. 2 is described herein as an example arrangement for illustrative purposes and is not intended to limit the scope of the present disclosure in any manner. In one example, the sensor data input chiplet 210 of FIG. 2 can correspond to the data input chiplet 110 shown in FIG. 1, and the workload processing chiplets 120 shown in FIG. 1, can correspond to one or more of the general compute chiplets 245, ML accelerator chiplet 250, and/or the autonomous drive chiplet 240 shown in FIG. 2.

Referring to FIG. 2, a sensor data input chiplet 210 of the SoC 200 can receive sensor data from various vehicle sensors 205 of the vehicle. These vehicle sensors 205 can include any combination of image sensors (e.g., single cameras, binocular cameras, fisheye lens cameras, etc.), LIDAR sensors, radar sensors, ultrasonic sensors, proximity sensors, and the like. The sensor data input chiplet 210 can automatically dump the received sensor data as it is received into a cache memory 231 of the central chiplet 220. The sensor data input chiplet 210 can also include an image signal processor (ISP) responsible for capturing, processing, and enhancing images taken from the various vehicle sensors 205. The ISP takes the raw image data and performs a series of complex image processing operations, such as color, contrast, and brightness correction, noise reduction, and image enhancement, to create a higher-quality image that is ready for further processing or analysis by the other chiplets of the SoC 200. The ISP may also include features such as auto-focus, image stabilization, and advanced scene recognition to further enhance the quality of the captured images. The ISP can then store the higher-quality images in the cache memory 231.

In some aspects, the sensor data input chiplet 210 publishes identifying information for each item of sensor data (e.g., images, point cloud maps, etc.) to a shared memory 230 of a central chiplet 220, which acts as a central mailbox for synchronizing workloads for the various chiplets. The identifying information can include details such as an address in the cache memory 231 where the data is stored, the type of sensor data, which sensor captured the data, and a timestamp of when the data was captured.

To communicate with the central chiplet 220, the sensor data input chiplet 210 transmits data through an interconnect 211a. Interconnects 211a-f each represent chip-to-chip (C2C) or die-to-die (D2D) interfaces between the chiplets of the SoC 200. In some aspects, the interconnects 211a-f can include high-bandwidth data paths used for general data purposes to the cache memory 231 and high-reliability data paths to transmit functional safety (FuSa) and scheduler information to the shared memory 230. Depending on bandwidth requirements, an interconnect 211a-f may include more than one die-to-die interface. For example, interconnect 211a can include two interfaces to support higher bandwidth communications between the sensor data input chiplet 210 and the central chiplet 220.

In one aspect, the interconnects 211a-f implement the Universal Chiplet Interconnect Express (UCIe) standard and communicate through an indirect mode to allow each of the chiplet host processors to access remote memory as if it were local memory. This is achieved by using a specialized Network-on-Chip (NoC) Network Interface Unit (NIU) (e.g., which allows freedom of interferences between devices connected to the network) that provides hardware-level support for remote direct memory access (RDMA) operations. In UCIe indirect mode, the host processor sends requests to the NIU, which then accesses the remote memory and returns the data to the host processor. This approach allows for efficient and low-latency access to remote memory, which can be particularly useful in distributed computing and data-intensive applications. Additionally, UCIe indirect mode provides a high degree of flexibility, as it can be used with a wide range of different network topologies and protocols.

In various examples, the SoC 200 can include additional chiplets that can store, alter, or otherwise process the sensor data cached by the sensor data input chiplet 210. The SoC 200 can include an autonomous drive chiplet 240 that can perform the perception, sensor fusion, trajectory prediction, and/or other autonomous driving algorithms of the autonomous vehicle. The autonomous drive chiplet 240 can be connected to a dedicated HBM-RAM chiplet 235 in which the autonomous drive chiplet 240 can publish all status information, variables, statistical information, and/or processed sensor data as processed by the autonomous drive chiplet 240.

In various examples, the system on chip 200 can further include a machine-learning (ML) accelerator chiplet 240 that is specialized for accelerating machine-learned or AI workloads, such as image inferences or other sensor inferences using machine learning, in order to achieve high performance and low power consumption for these workloads. The ML accelerator chiplet 240 can include an engine designed to efficiently process graph-based data structures, which are commonly used in AI workloads, and a highly parallel processor, allowing for efficient processing of large volumes of data. The ML accelerator chiplet 240 can also include specialized hardware accelerators for common AI operations such as matrix multiplication and convolution as well as a memory hierarchy designed to optimize memory access for AI workloads, which often have complex memory access patterns.

The general compute chiplets 245 can provide general purpose computing for the system on chip 200. For example, the general compute chiplets 245 can comprise high-powered central processing units and/or graphical processing units that can support the computing tasks of the central chiplet 220, autonomous drive chiplet 240, and/or the ML accelerator chiplet 250.

In various implementations, the shared memory 230 can store programs and instructions for performing autonomous driving tasks. The shared memory 230 of the central chiplet 220 can further include a reservation table that provides the various chiplets with the information needed (e.g., sensor data items and their locations in memory) for performing their individual tasks. In various aspects, the central chiplet 220 also includes the large cache memory 231, which supports invalidate and flush operations for stored data. Further description of the shared memory 230 in the context of the central chiplet 220 is provided below with respect to FIG. 3.

Cache miss and evictions from the cache memory 231 are sent by a high-bandwidth memory (HBM) RAM chiplet 255 connected to the central chiplet 220. The HBM-RAM chiplet 255 can include status information, variables, statistical information, and/or sensor data for all other chiplets. In certain examples, the information stored in the HBM-RAM chiplet 255 can be stored for a predetermined period of time (e.g., ten seconds) before deleting or otherwise flushing the data. For example, when a fault occurs on the autonomous vehicle, the information stored in the HBM-RAM chiplet 255 can include all information necessary to diagnose and resolve the fault. Cache memory 231 keeps fresh data available with low latency and less power required compared to accessing data from the HBM-RAM chiplet 255.

As provided herein, the shared memory 230 can house a mailbox architecture in which a reflex program comprising a suite of instructions is used to execute workloads by the central chiplet 220, general compute chiplets 245, and/or autonomous drive chiplet 240. In certain examples, the central chiplet 220 can further execute a FuSa program 138 that operates to compare and verify outputs of respective pipelines to ensure consistency in the ML inference operations. In still further examples, the central chiplet 220 can execute a thermal management program 137 to ensure that the various components of the SoC 200 operate within normal temperature ranges.

It is contemplated that preventing interference using simultaneous multi-threaded processing can further be implemented on monolithic chip arrangements. In particular, it is contemplated that reaggregation of computing hardware with processing capabilities matching or exceeding UCIe-based chiplet arrangement into monolithic chips may occur in the future. Accordingly, the process of including a thread number 152 in a reservation table 150 of a shared memory 160, and performing workload processing in independent pipelines-referenced by thread number 152—using out-of-order buffers may also be implemented for monolithic chips.

Workload Pipelines/Processes

Figure 3A:
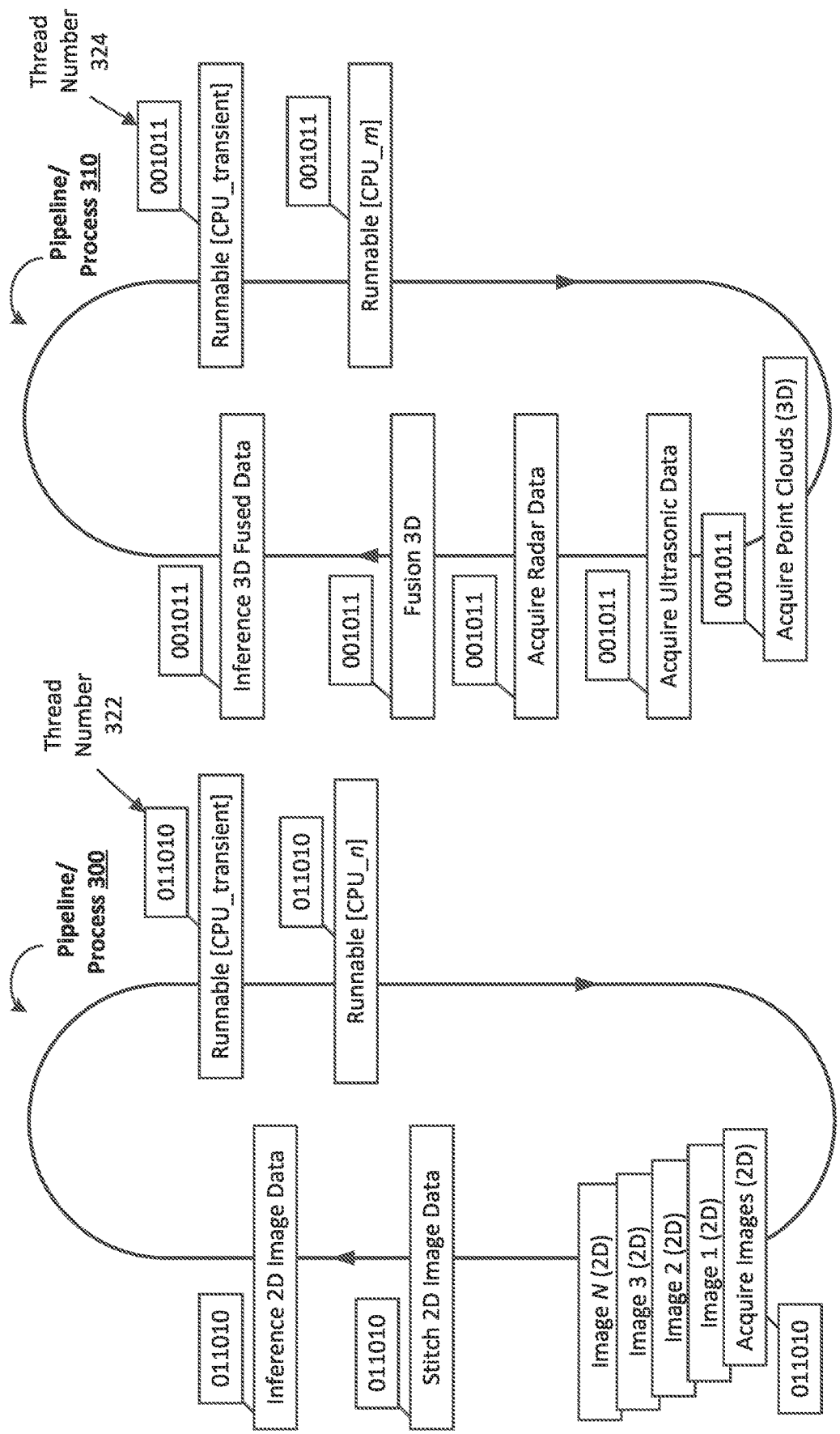
FIGS. 3A and 3B depict examples of workloads being executed as runnables in independent pipelines or processes as identified by thread numbers, in accordance with examples described herein.

FIG. 3A depicts workloads and/or runnables being executed in a set of independent pipelines or processes 300, 310, according to examples described herein. In the below discussion of FIG. 3A, various workloads can be executed in independent deterministic pipelines or processes 300, 310 by one or more processors 140 of the central chiplet 100 and/or the workload processing chiplets 120 through execution of the data analysis program 130, application program 135, thermal management program 137, FuSa program 138, and/or scheduling program 142 as depicted in FIG. 1. As provided herein, the pipelines or processes 300, 310 shown in FIG. 3A comprise respective sets of workloads, such as acquiring images from cameras or instances of three-dimensional data (e.g., ultrasonic, LIDAR, and/or radar data), performing sensor data fusion, and performing inference operations on the fused data. In accordance with embodiments, the use of dedicated thread numbers 322, 324 for each pipeline/process 300, 310 enables each pipeline/process 300, 310 to execute in parallel free of scheduling interferences with each other.

Referring to FIG. 3A, pipeline/process 300 and pipeline/process 310 are executed in parallel by one or more chiplets of the SoC. While only a pair of pipelines/processes 300 and 310 are shown in FIG. 3A, any number of pipelines and/or processes can be executed in parallel by the central chiplet 100 and/or workload processing chiplets 120 in performing the data analysis tasks (e.g., reflex tasks) and application tasks described throughout the present disclosure. As described herein, the reflex and application tasks can comprise data acquisition, analysis, and processing tasks, such as sensor data fusion and ML inference tasks that facilitate scene understanding of the surrounding environment of an autonomous vehicle, motion prediction, motion planning, and vehicle control tasks for autonomously operating the vehicle. Additional tasks may also be executed in individual pipelines and/or processes, such as power control tasks, thermal management tasks, health monitoring tasks, and the like.

In various implementations, the scheduling program 142 can cause the workloads represented by the workload entries in the reservation table 150 to be executed deterministically in independent pipelines and/or processes, such that the order of workload execution in each pipeline is consistent and non-reversible. Furthermore, the workloads executed in each pipeline can comprise a chain of dependency, such that the output of the pipelines are based on the same or similar workloads being sequentially executed in each pipeline. As such, complexity in the inference operations is significantly reduced, which can facilitate certification of each individual pipeline for autonomous driving purposes.

As provided herein, pipeline and/or process 300 can be associated with a thread number 322 and pipeline and/or process 310 can be associated with a different thread number 324. Each task in pipeline/process 300 can correspond to a workload referenced in the reservation table 150, and can be associated with the same thread number 322 to indicate that the workload is to be executed as a runnable in pipeline/process 300. Likewise, each task in pipeline/process 310 can be referenced in the reservation table 150 by thread number 324, which can also identify that the workload is to be executed as a runnable in pipeline/process 310. As provided herein, any number of pipelines and/or processes can be executed in parallel (e.g., independently and simultaneously) as workloads assigned to those pipelines/processes become available. Each pipeline/process executing in parallel can comprise an individual thread that can be associated with a dedicated thread number, which associates all workloads assigned to the individual thread in the reservation table 150.

As an example, pipeline or process 300 can be tasked with performing inference on two-dimensional image data (e.g., to identify and classify other dynamic entities proximate to the vehicle in the images). A first workload in pipeline/process 300 can comprise obtaining images captured by each camera of the vehicle at a given time. A second workload in pipeline/process 300 can comprise stitching the images to form a 360-degree ribbon of the surrounding environment of the vehicle. A third workload in pipeline/process 300 can comprise performing inference on the two-dimensional image data (e.g., pixel analysis to identify the dynamic entities). Accordingly, an output of pipeline/process 300 can comprise a two-dimensional ribbon with dynamic entities identified (e.g., with a bounding box) and/or classified (e.g., as bicyclists, other vehicles, pedestrians, etc.).

As another example, pipeline and/or process 310 can be tasked with performing inference on three-dimensional sensor fusion data (e.g., comprising fused LIDAR, image, and/or radar data). For example, pipeline/process 310 can also be tasked with identifying external dynamic entities in the three-dimensional data. A first workload in pipeline/process 310 can comprise acquiring point clouds generated by LIDAR sensors of the vehicle at a given time, and acquiring radar and ultrasonic data from the same time. A second workload in pipeline/process 310 can comprise fusing the sensor data to provide a three-dimensional, fused sensor view of the surrounding environment of the vehicle. A third workload in pipeline/process 310 can comprise performing inference on the three-dimensional sensor fusion data to identify and/or classify the external dynamic entities.

As described herein, the workload processing chiplets (e.g., workload processing chiplets 120 and the central chiplet 100 of FIG. 1) can execute respective workloads in various other deterministic pipelines and/or processes (e.g., in accordance with the data analysis program 130 and/or application program 135 shown in FIG. 1). For example, a first pipeline and/or process can be dedicated for identifying traffic signals in two-dimensional image data, a second pipeline and/or process can be dedicated for identifying traffic signals in three-dimensional sensor fusion data, a third pipeline and/or process can be dedicated for identifying and classifying lane markings, a fourth pipeline and/or process can be dedicated for generating occupancy grid maps from the sensor data, a fifth pipeline and/or process can be dedicated for predicting the motion of external dynamic entities, a sixth pipeline and/or process can be dedicated for planning the motion of the vehicle based on the inferences from other pipelines, a seventh pipeline and/or process can be dedicated for controlling the vehicle's control systems to execute the motion plan generated by the sixth pipeline/ process, and so on.

According to various examples, the workloads or tasks performed in each pipeline and/or process can be ordered deterministically (e.g., by the scheduling program 142 of FIG. 1), which can significantly reduce complexity in certifying the autonomous drive system. For example, a single inference mechanism for an autonomous drive system that performs natural order processing using image data may not be certifiable due to the complexity and randomness of its workload executions, as well as the potential for outliers in the single inference mechanism (e.g., confusion about certain detected objects and lack of comparison between multiple inference mechanisms). These outliers may result in stuck states or collisions for the autonomous vehicle. With the use of deterministic pipelines that independently execute workloads, any outliers from one pipeline can be mitigated or otherwise overcome by comparison and confirmation mechanisms from other pipelines.

As shown in FIG. 3, the various workloads of pipeline/ process 300 and pipeline/process 310 can be executed as runnables on one or more processors of one or more chiplets of the SoC 200. In certain examples, a transient-resistant CPU (e.g., of central chiplet 220 and/or general compute chiplets 245) can execute the workloads in pipeline/process 300 and pipeline/process 310. It is contemplated that the use of robust, transient-resistant CPUs (e.g., ASIL-D rated CPUs) for executing workloads in the independent deterministic pipelines and/or processes can further bolster the ASIL rating of the autonomous drive system as a whole. These transient-resistant CPUs can be manufactured for robustness in terms of reliability, resistance to heat, cold, radiation, wear, age, vibration, shock, etc. It is further contemplated that transient-resistant CPUs may not have the computing power of modern, non-transient-resistant CPUs (e.g., having an ASIL-B rating) that are designed and manufactured to maximize bandwidth and processing speed.

As shown in FIG. 3, the workloads in pipeline/process 300 and pipeline/process 310 can be executed as runnables on multiple CPUs of the SoC 200 and/or multiple chiplets of the SoC 200. For example, a transient-resistant CPU can execute workloads in each pipeline/process 300, 310 and can be backed up by one or more state-of-the art CPUs that execute the same workloads in each pipeline/process 300, 310. The transient-resistant CPU(s) may execute workloads in each pipeline/process 300, 310 at a lower frequency than the other CPUs. For example, the transient-resistant CPU(s) can execute the workloads in each pipeline/process 300, 310 and provide output on the order of microseconds, whereas the other CPUs can provide output for each pipeline/process 300, 310 on the order of nanoseconds.

Accordingly, multiple hardware components can reference the same thread number 152 in the reservation table 150 to execute workloads in the same pipeline/process 300. In the example shown in FIG. 3A, both CPU_n and CPU_transient execute workloads associated with thread number 322, but may do so at different frequencies. For example, CPU_n can comprise a state-of-the art processing core (e.g., housed in a general compute chiplet 245) that can process workloads in pipeline/process 300 on the order of nanoseconds, whereas CPU_transient can comprise a highly reliable processing core (e.g., an ASIL-D rated core housed in the central chiplet 220) that can process workloads in pipeline/ process 300 on the order of microseconds. In such an example, CPU-transient can serve to verify the outputs of CPU_n in pipeline 300 (e.g., every thousandth or so iteration), or vice versa, to provide verification and redundancy in the system.

Likewise, CPU_m can comprise a state-of-the art processing core that processes workloads in pipeline/process 310, and CPU_transient can process the same workloads in pipeline/process 310 at a lower frequency to verify that the outputs of CPU_m are accurate (or vice versa). Accordingly, while each thread number 152 can correspond to a dedicated thread or pipeline, multiple workload processing components can execute workloads in the same thread in parallel to provide redundancy and verification.

In an example, the transient-resistant CPUs may execute workloads in deterministic pipeline/process 300 and identify external dynamic objects (e.g., other vehicles, bicyclists, pedestrians, etc.) in two-dimensional image data every few microseconds. The other CPU may execute the same workloads in deterministic pipeline/process 300 to identify the same external dynamic entities every few nanoseconds (e.g., or at the same frequency that the images are generated by the cameras). Thus, the output by the transient-resistant CPU(s) can be verified or confirmed by the output of the other CPU(s) in each deterministic pipeline and/or process. These processes can occur for each independent pipeline/process performing inference operations (e.g., executing a reflex program), and can further be utilized for the application program 135, thermal management program 137, and/or the FuSa program 138.

Figure 3B:
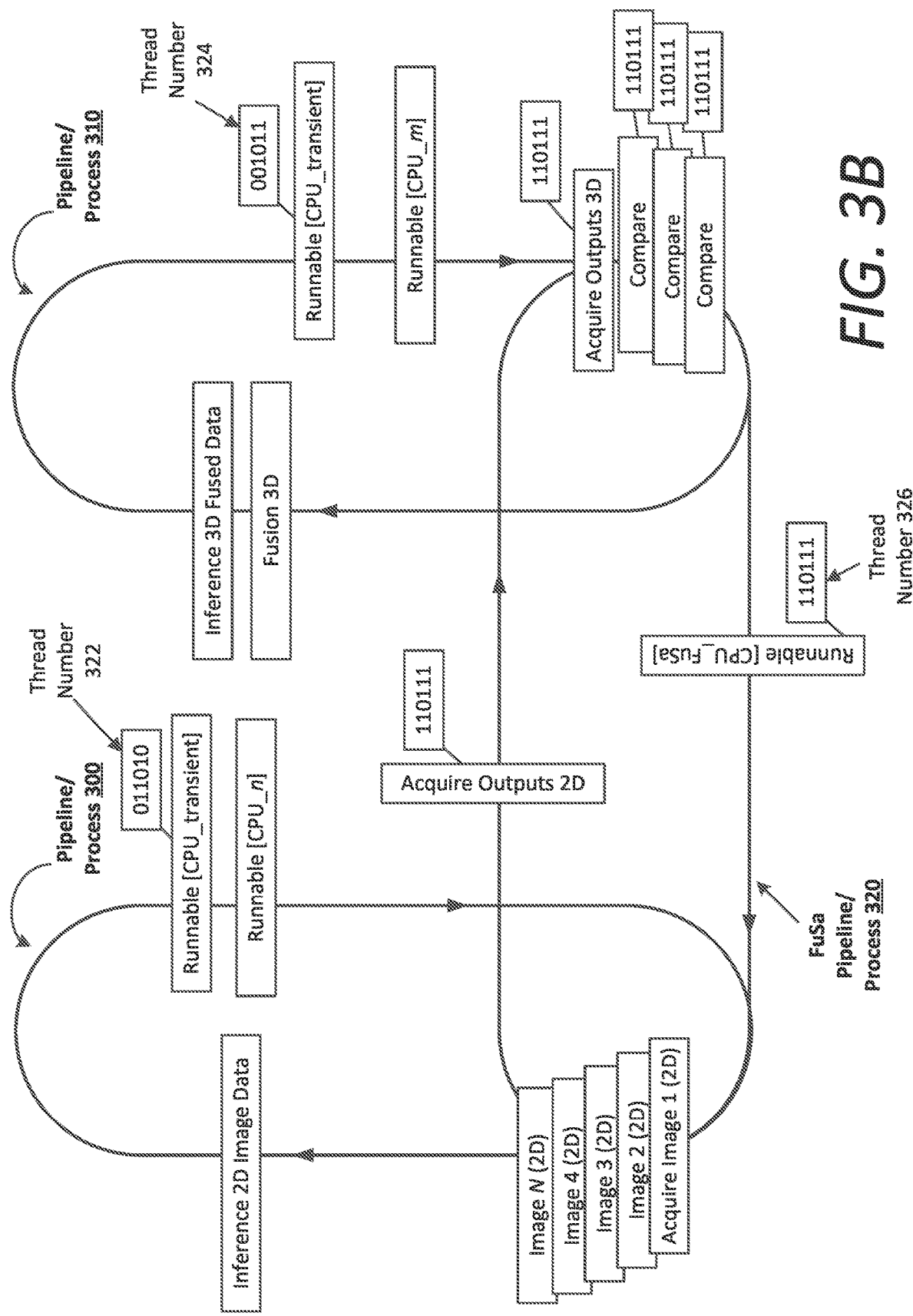

In certain aspects, the workloads of pipeline/process 300 and pipeline 310 can be executed by one or more CPUs of the central chiplet 220 and/or one or more CPUs of the general compute chiplets 245. To provide further redundancy for verification of pipeline output, FIG. 3B shows an example FuSa pipeline/process 320 that dynamically compares and verifies the output of the runnables for each pipeline/process 300, 310, according to various examples. In certain implementations, the FuSa pipeline/process 320 can compare the output of multiple runnables performed by different CPUs in each pipeline/process 300, 310 (e.g., transient-resistance CPUs and state-of-the art CPUs), as well as comparing the output of pipeline/process 300 with the output of pipeline/process 310.

As shown in FIG. 3B, the FuSa pipeline/process 320 can be associated with a dedicated thread number 326. In some examples, these FuSa workloads identified by thread number 326 can be referenced in the reservation table 150 by a workload processing chiplet 120 or one or more processors 140 of the central chiplet 100, and can also include workload identifiers, cache addresses, dependency information, and the like. In the example of identifying and classifying dynamic external entities, the two-dimensional output from pipeline/process 300 can indicate the entities in image data that lacks precise distance information to each entity, whereas the three-dimensional output from pipeline/process 310 may lack information such as color and edge detail that facilitates classification of the external entities. Furthermore, the sensor fused data processed in pipeline/process 310 can include radar and/or ultrasonic data that can provide detailed proximity and or speed differential information of the external entities.

As such, the output of pipeline/process 300 and pipeline/ process 310 can have different outliers that, when viewed alone, can affect the accuracy the autonomous drive system's capabilities. As described herein, the various workload processing chiplets (e.g., chiplets 120 and central chiplet 100 of FIG. 1) can execute workloads in any number of pipelines and/or processes in parallel, with each pipeline/process having different outliers based on the sensor data being processed. As further described herein, the output of certain pipelines and/or processes can be compared with the output of other pipelines/processes through the execution of one or more FuSa pipelines/processes 320 that acquire and dynamically verify the respective output of different independent pipelines/processes.

As shown in FIG. 3B, the FuSa pipeline/process 320 can acquire the output of pipeline/process 300 and pipeline/process 310 and compare and verify their output. As described herein, the output can correspond to any inference operations relating to the processing of sensor data from the sensor system of the vehicle. In certain examples, the runnable of the FuSa pipeline/process 320 can be executed on a dedicated CPU (e.g., on the central chiplet 220 of the SoC 200 arrangement as shown in FIG. 2).

In the example shown in FIG. 3B, the FuSa pipeline/process 320 acquires the two-dimensional output of pipeline/process 300 and the three-dimensional output of pipeline/process 310. The FuSa pipeline/process 320 then compares the two-dimensional and three-dimensional output to determine whether they are consistent with each other. For inferences involving the identification and/or classification of external dynamic entities, the FuSa pipeline/process 320 will confirm whether pipeline/process 300 and pipeline/process 310 have both separately identified and/or classified the same external dynamic entities in the surrounding environment of the vehicle using different sensor data and/or techniques having different outliers.

While the examples shown in FIGS. 3A and 3B show pipelines and/or processes involving different types of sensor data, numerous other deterministic pipelines and/or processes are contemplated in which a FuSa pipeline/process is utilized to compare and dynamically verify their output. For example, this can include a FuSa pipeline that compares output of multiple pipelines tasked to identify traffic signals and traffic signal states, output of motion prediction pipelines tasked to predict the motion of external dynamic entities, and comparable output of other deterministic pipelines that facilitate in autonomously operating the vehicle. As such, any issue that occurs in any pipeline can be readily detected and flagged by a FuSa pipeline. It is contemplated that the use of transient-resistant CPUs with support from general compute CPUs, the execution of workloads in verifiable deterministic pipelines, and the use of FuSa pipelines to dynamically compare and verify the output from the deterministic pipelines, can all combine to provide an increased ASIL rating (e.g., an ASIL-D rating) for the autonomous driving system of the vehicle.

Multiple-System-on-Chip

Figure 4:
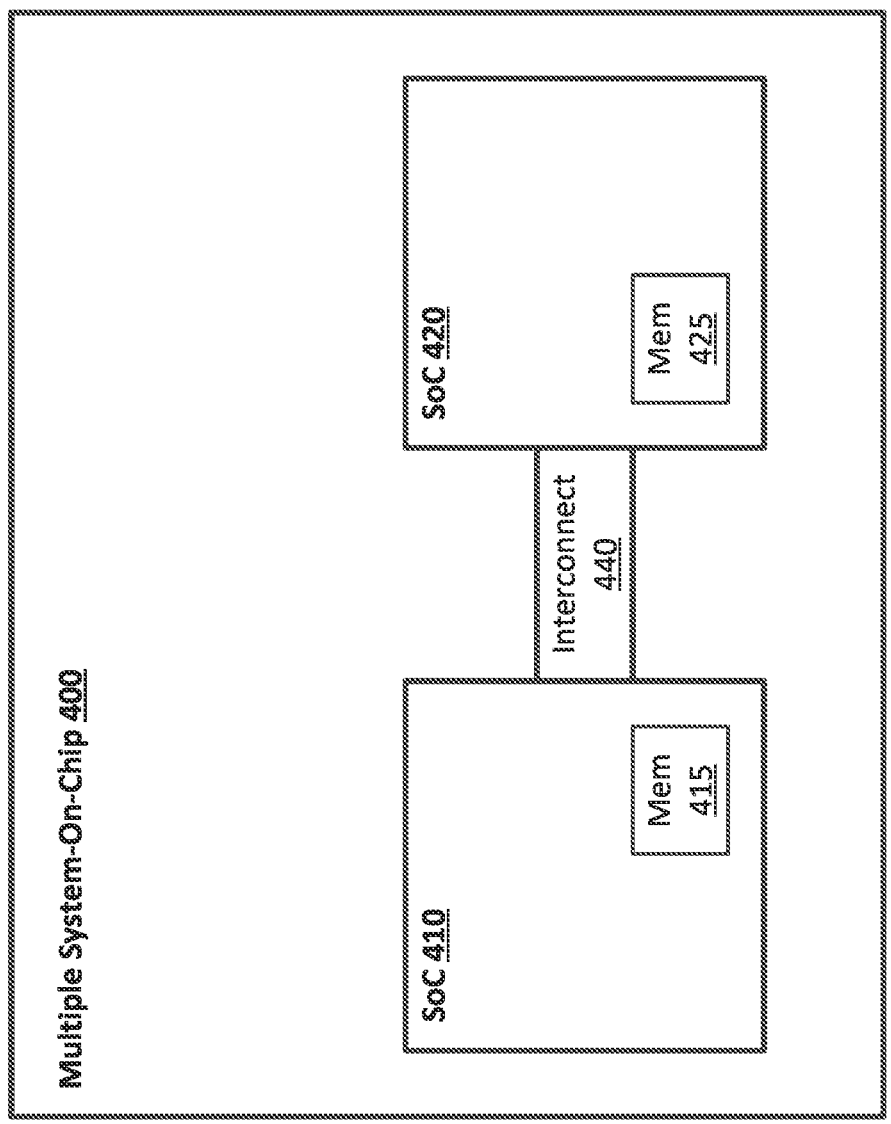
FIG. 4 is a block diagram depicting an example multiple system-on-chip (mSoC), in accordance with examples described herein.

FIG. 4 is a block diagram depicting an example computing system implementing a multiple system-on-chip (mSoC) 400 arrangement, in accordance with examples described herein. In various examples, the computing system can include a first SoC 410 having a first memory 415 and a second SoC 420 having a second memory 425 coupled by an interconnect 440 (e.g., an ASIL-D rated interconnect) that enables each of the first SoC 410 and second SoC 420 to read each other's memories 415, 425. As provided herein, the memories 415, 425 of SoC 410 and 420 can correspond to the shared memory 160 of the central chiplet 100, as shown and described with respect to FIG. 1. During any given session, the first SoC 410 and the second SoC 420 may alternate roles, between a primary SoC and a backup SoC. As provided herein, the primary SoC can perform various autonomous driving tasks, such as perception, object detection and classification, grid occupancy determination, sensor data fusion and processing, motion prediction (e.g., of dynamic external entities), motion planning, and vehicle control tasks. The backup SoC can maintain a set of computational components (e.g., CPUs, ML accelerators, and/or memory chiplets) in a low power state, and continuously or periodically read the memory of the primary SoC.

For example, if the first SoC 410 is the primary SoC and the second SoC 420 is the backup SoC, then the first SoC 410 performs a set of autonomous driving tasks and publishes state information corresponding to these tasks in the first memory 415. The second SoC 420 reads the published state information in the first memory 415 to continuously check that the first SoC 410 is operating within nominal thresholds (e.g., temperature thresholds, bandwidth and/or memory thresholds, etc.), and that the first SoC 410 is performing the set of autonomous driving tasks properly. As such, the second SoC 420 performs health monitoring and error management tasks for the first SoC 410, and takes over control of the set of autonomous driving tasks when a triggering condition is met. As provided herein, the triggering condition can correspond to a fault, failure, or other error experienced by the first SoC 410 that may affect the performance of the set of tasks by the first SoC 410.

In various implementations, the second SoC 420 can publish state information corresponding to its computational components being maintained in a standby state (e.g., a low power state in which the second SoC 420 maintains readiness to take over the set of tasks from the first SoC 410). In such examples, the first SoC 410 can monitor the state information of the second SoC 420 by continuously or periodically reading the memory 425 of the second SoC 420 to also perform health check monitoring and error management on the second SoC 420. For example, if the first SoC 410 detects a fault, failure, or other error in the second SoC 420, the first SoC 410 can trigger the second SoC 420 to perform a system reset or reboot.

In certain examples, the first SoC 410 and the second SoC 420 can each include a functional safety (FuSa) component (e.g., a FuSa program 138 executed by one or more processors 140 of a central chiplet 100, as shown and described with respect to FIG. 1) that performs the health monitoring and error management tasks. The FuSa component can be maintained in a powered state for each SoC, whether the SoC operates in a primary or backup manner. As such, the backup SoC may maintain its other components in a low powered state, with its FuSa component being powered up and performing the heath monitoring and error management tasks described herein.

In various aspects, when the first SoC 410 operates as the primary SoC, the state information published in the first memory 415 can correspond to the set of tasks being performed by the first SoC 410. For example, the first SoC 410 can publish any information corresponding to the surrounding environment of the vehicle (e.g., any external entities identified by the first SoC 410, their locations, and predicted trajectories, detected objects, such as traffic signals, signage, lane markings, and crosswalk, and the like). The state information can further include the operating temperatures of the computational components of the first SoC 410, bandwidth usage and available memory of the chiplets of the first SoC 410, and/or any faults or errors, or information indicating faults or errors in these components.

In further aspects, when the second SoC 420 operates as the backup SoC, the state information published in the second memory 425 can correspond to the state of each computational component of the second SoC 420. In particular, these components may operate in a low power state in which the components are ready to take over the set of tasks being performed by the first SoC 410. The state information can include whether the components are operating within nominal temperatures and other nominal ranges (e.g., available bandwidth, power, memory, etc.).

As described throughout the present disclosure, the first SoC 410 and the second SoC 420 can switch between operating as the primary SoC and the backup SoC (e.g., each time the system 400 is rebooted). For example, in a computing session subsequent to a session in which the first SoC 410 operated as the primary SoC and the second SoC 420 operated as the backup SoC, the second SoC 420 can assume the role of the primary SoC and the first SoC 410 can assume the role of the backup SoC. It is contemplated that this process of switching roles between the two SoCs can provide substantially even wear of the hardware components of each SoC, which can prolong the lifespan of the mSoC 400 as a whole.

According to embodiments, the first SoC 410 can be powered by a first power source and the second SoC 420 can be powered by a second power source that is independent or isolated from the first power source. For example, in an electric vehicle, the first power source can comprise the battery pack used for propelling the electric motors of the vehicle, and the second power source can comprise the auxiliary power source of the vehicle (e.g., a 12-volt battery). In other implementations, the first and second power sources can comprise other types of power sources, such as dedicated batteries for each SoC 410, 420 or other power sources that are electrically isolated or otherwise not dependent from each other.

It is contemplated that the mSoC 400 can be provided to increase the safety integrity level (e.g., ASIL rating) of the computing environment and the overall autonomous driving system of the vehicle. As described herein, the autonomous driving system can include any number of dual SoC arrangements, each of which can perform a set of autonomous driving tasks. In doing so, the backup SoC dynamically monitors the health of the primary SoC in accordance with a set of functional safety operations, such that when a fault, failure, or other error is detected, the backup SoC can readily power up its components and take over the set of tasks from the primary SoC. As provided herein, further description of mSoC embodiments for vehicle computing is provided in U.S. patent application Ser. No. 18/195,776, which is hereby incorporated by reference in its entirety.

Methodology

Figure 5:
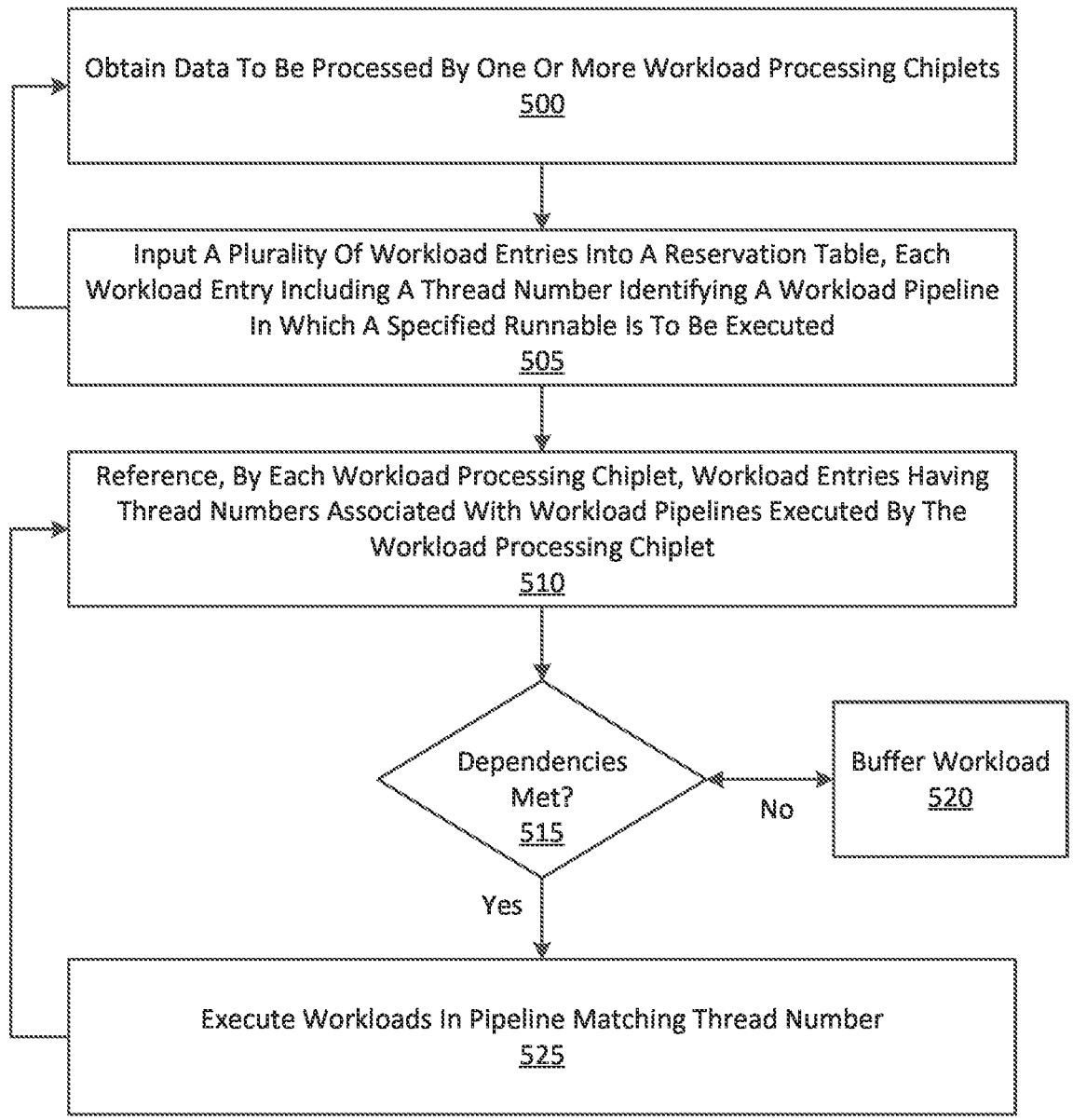
FIGS. 5, 6, and 7 are flow charts describing example methods of implementing simultaneous multi-threaded processing using thread tags to prevent workload interference, according to various examples.
Figure 6:
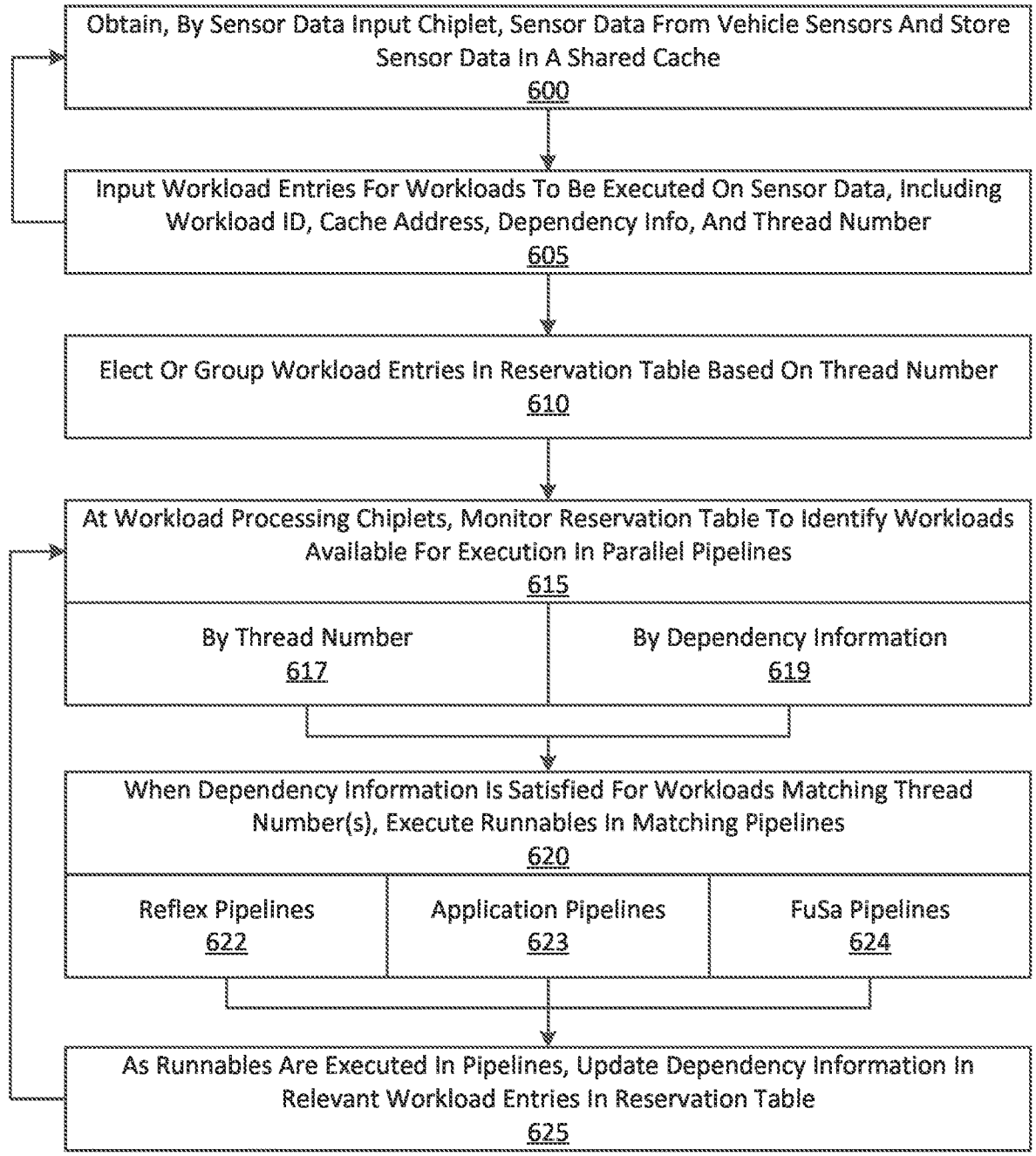
Figure 7:
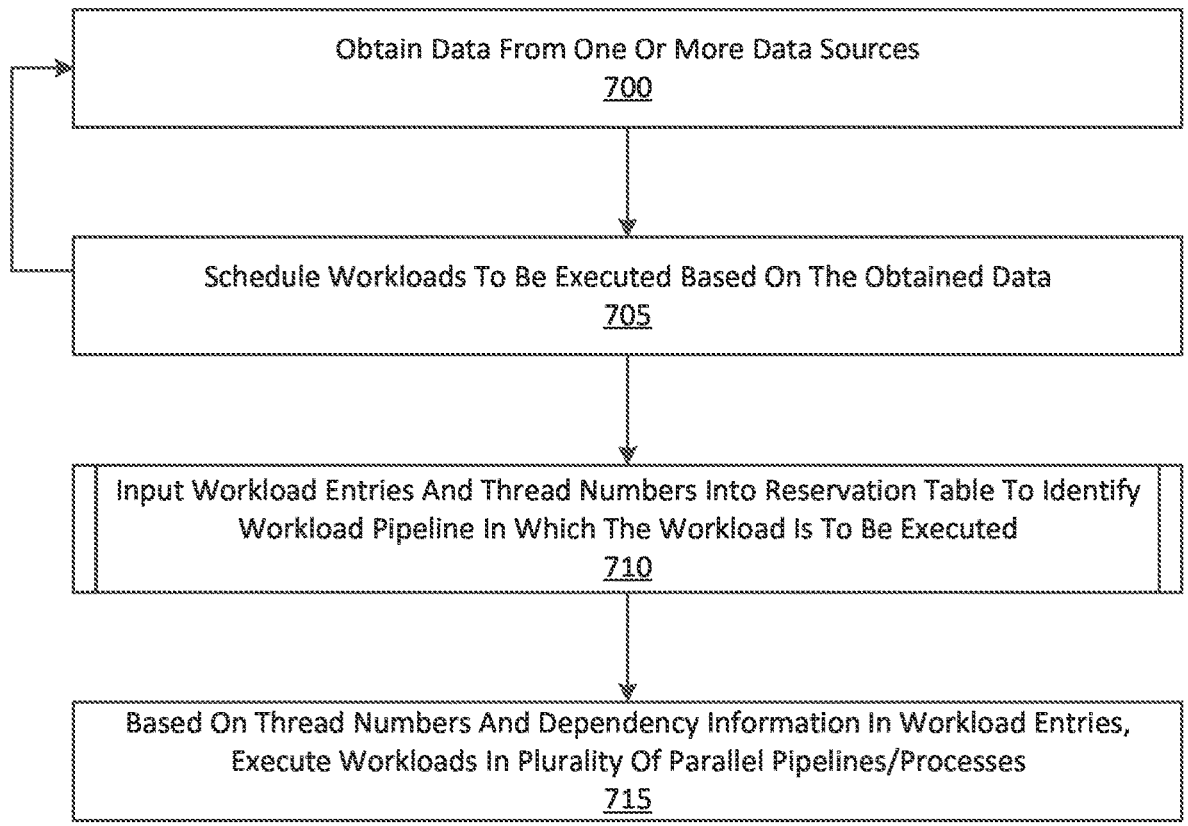

FIGS. 5, 6, and 7 are flow charts describing example methods of implementing simultaneous multi-threaded processing using thread tags to prevent workload interference, according to various examples. In the below discussion of the methods of FIGS. 5,d 6, and 7, reference may be made to reference characters representing certain features described with respect to FIGS. 1 through 4. Furthermore, the steps described with respect to the flow charts of FIGS. 5, 6, and 7 may be performed by (i) one or more components of the data input chiplet 110, the central chiplet 100, and/or the workload processing chiplets 120 of FIG. 1, (ii) one or more components of the system-on-chip 200 as shown and described with respect to FIG. 2, one or more components of the mSoC 400 as shown and described with respect to FIG. 4, or one or more components of a monolithic chip that includes a shared memory, as described herein. Further still, certain steps described with respect to the flow chart of FIGS. 5, 6, and 7 may be performed prior to, in conjunction with, or subsequent to any other step, and need not be performed in the respective sequences shown.

Referring to FIG. 5, at block 500, a data input chiplet 110 can obtain input data to be processed by one or more workload processing chiplets 120. As provided herein, the data input chiplet 110 and workload processing chiplets 120 can be included on a system-on-chip that can further include a central chiplet 100 comprising a shared memory 160 housing a reservation table 150. At block 505, the central chiplet 100 (e.g., via a scheduling program 142) can input a plurality of workload entries into the reservation table 150, where each workload entry includes a thread number 152 identifying particular workload pipeline or thread in which a workload corresponding to the workload entry is to be executed. As shown in FIG. 5, the process of obtaining data and inputting workload entries can be continuous, and is not limited to any data type or workload definition.

At block 510, each workload processing chiplet 120 can reference workload entries in the reservation table 150 having thread numbers 152 associated with workload pipelines or threads that are executed or otherwise handled by the workload processing chiplet 120. In some embodiments, the central chiplet 100 can further include one or more processing cores that can execute runnables in workload pipelines or threads. In such embodiments, the processing cores of the central chiplet 100 can also reference workload entries in the reservation table 150 that correspond to workloads to be executed in the workload pipelines or threads executed or otherwise handled by the central chiplet's processing cores. As such, the central chiplet 100 can also be included as a "workload processing chiplet" having processing cores that monitor the reservation table 150.

At decision block 515, the workload processing chiplet can determine whether the dependencies for workloads in the pipelines processed by the workload processing chiplet have been met. If not, then at block 520, the workload processing chiplet can buffer the workload in an out-of-order buffer, as described herein. However, if the dependencies have been met, then at block 525, the workload processing chiplet can execute the workloads in the specified pipeline or thread associated with the thread number 152. As shown in FIG. 5, the process may repeat for each iteration (e.g., as a directional pipeline loop as shown in FIGS. 3A and 3B).

FIG. 6 is a flow chart describing an example method of referencing thread numbers for executing workloads in parallel pipelines for autonomous vehicle purposes, according to examples described herein. Referring to FIG. 6, at block 600, a sensor data input chiplet 210 of a system-on-chip 200 of an autonomous vehicle can obtain sensor data from a sensor system 205 of the vehicle, and store the sensor data in a shared cache 231 of a central chiplet 220. At block 605, the central chiplet 220 can input workload entries into a reservation table 150 (e.g., via a scheduling program 142) for workload entries to be executed based on the sensor data, each of which can include a workload identifier, cache address, dependency information (if any), and a thread number 152. As shown in FIG. 6, blocks 600 and 605 may be performed dynamically as sensor data is captured by each sensor of the vehicle's sensor system 205 (e.g., point cloud maps from LIDAR sensors, images from cameras, radar data sweeps, and the like).

In certain examples, at block 610, the central chiplet 220 or workload processing chiplets 120 (e.g., the general compute chiplets 245, autonomous drive chiplet 240, and/or ML accelerator chiplet 250) can elect or group workload entries in the reservation table 150 based on thread number 152. At block 615, the workload processing chiplets (e.g., central chiplet 220, general compute chiplets 245, autonomous drive chiplet 240, and/or ML accelerator chiplet 250) can monitor the reservation table 150 to identify workloads available for execution in a plurality of parallel pipelines based on thread number 152. For example, the workload processing chiplets can identify relevant workloads by matching thread number 152, at block 617, and determine availability based on the dependency information in relevant workload entries, at block 619. For example, if the dependency information in a workload has not been satisfied, the workload processing chiplet can buffer the workload in an out-of-order buffer.

At block 620, when the dependency information is satisfied for workloads matching the thread number 152 of a workload pipeline handled by the workload processing chiplet, the workload processing chiplet can execute the corresponding runnable in the workload pipeline that matches the thread number 152. As described herein, the workloads and corresponding pipelines can comprise reflex workloads in reflex pipelines, at block 622, which can correspond to processes of fusing sensor data and performing inference operations on the sensor data (e.g., object detection and classification, occupancy grid determination, lane detection, motion prediction, motion planning, etc.).

At block 623, the workloads and corresponding pipelines can comprise vehicle control workloads in application pipelines, which can correspond to vehicle control operations, such as physically operating the steering, acceleration, braking, and auxiliary systems of the vehicle. At block 624, the workload and corresponding pipelines can comprise FuSa workloads in FuSa pipelines, such as comparing outputs from multiple reflex pipelines to verify consistency (e.g., that a pedestrian at a specific location detected in a 2D inference pipeline is also detected in the same location in a 3D inference pipeline). As described herein, the workloads and corresponding pipelines can further comprise thermal management workloads in thermal management pipelines, or any data analysis workloads in any data analysis pipelines for any specified application.

At block 625, as runnables are executed in their respective pipelines, the central chiplet 220 can update dependency information in relevant workload entries in the reservation table 150. Furthermore, workload entries corresponding to completed workloads can be tagged or a bitwise operator or binary value representing the workload can be changed (e.g., from 0 to 1) to indicate in the reservation table 150 that the workload has been completed. Thereafter, the workload entry may be overwritten by a new entry in block 605. As shown in FIG. 6, the processes of blocks 615, 620, and 625 may also be continuously repeated at speeds and frequencies that correspond to the speeds and frequencies that, for example, the sensor data is captured.

FIG. 7 is a flow chart describing a method of implementing simultaneous multi-threaded processing using thread tags to prevent workload interference, according to one or more examples. In particular, the method described in connection with FIG. 7 may be implemented by one or more processors, processing cores, or CPUs (hereinafter "computing resources") of a system-on-chip, multiple-system-on-chip, and/or monolithic chip in accordance with the embodiments described herein. Referring to FIG. 7, at block 700, the computing resources may obtain data from one or more data sources. For example, the computing resources may obtain any type of data using a network communication interface that connects the computing resources to the data sources one or more networks (e.g., wired network, Wi-Fi, cellular, etc.).

At block 705, the computing resources may then schedule workloads to executed based on the obtained data. In doing so, at block 710, the computing resources can input workload entries that include thread numbers into a reservation table stored in a shared memory of the computing resources (e.g., a shared memory of a monolithic chip), where the thread number identifies the workload pipeline, process, or thread in which the workload corresponding to the workload entry is to be executed. At block 715, based on the thread numbers and dependency information in the workload entries, the computing resources can execute the workloads in a plurality of parallel workload pipelines, processes, or threads. In particular, for each workload pipeline, process, or thread corresponding to each thread number, the computing resources can buffer workloads with unsatisfied dependencies and execute workload in their respective pipelines (as identified by the thread numbers) when dependencies are met.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature.

What is claimed is:

1. A system-on-chip comprising:
   a data input chiplet to obtain data from one or more data sources;
   one or more workload processing chiplets accessing the data obtained by the data input chiplet to execute respective workloads;
   a central chiplet including a shared memory comprising a reservation table listing a plurality of workload entries, each respective workload entry corresponding to a specified workload to be executed by the one or more workload processing chiplets in a respective workload pipeline;
   wherein the central chiplet inputs a thread number for each respective workload entry in the reservation table, the thread number identifying a workload pipeline, from a set of workload pipelines executed by the one or more workload processing chiplets, in which the specified workload is to be executed; and
   wherein the one or more workload processing chiplets executes respective workloads in the set of workload pipelines in parallel in accordance with the thread number in the reservation table for the specified workload.

2. The system-on-chip of claim 1, wherein each workload entry, in a subset of workload entries of the plurality of workload entries, includes dependency information indicating workloads that must be executed before a workload corresponding to the workload entry can be executed.

3. The system-on-chip of claim 2, wherein the reservation table further updates the dependency information for each of the subset of workload entries as workloads are executed by the one or more workload processing chiplets in the set of workload pipelines.

4. The system-on-chip of claim 2, wherein the respective workload processing chiplet elects or groups the plurality of workload entries in the reservation table based on the thread number associated with each workload pipeline in the plurality of workload pipelines processed by the respective workload processing chiplet.

5. The system-on-chip of claim 4, wherein the respective workload processing chiplet further references the dependency information of workload entries in the reservation table having the thread number associated with each workload pipeline in the plurality of workload pipelines processed by the respective workload processing chiplet.

6. The system-on-chip of claim 5, wherein the respective workload processing chiplet executes select workloads in the plurality of workload pipelines when the dependency information for each of the select workloads is satisfied.

7. The system-on-chip of claim 2, wherein, when the dependency information for a particular workload entry has not been satisfied, a workload associated with the particular workload entry is buffered in an out-of-order buffer.

8. The system-on-chip of claim 1, wherein inputting the thread number for each respective workload entry in the reservation table (i) reduces or removes interference by identifying in which workload pipeline, of the set of workload pipelines, a workload corresponding to the respective workload entry is to be executed, and (ii) optimizes transistor usage in the system-on-chip to reduce material and resource waste in semiconductor manufacturing.

9. The system-on-chip of claim 1, wherein data input chiplet comprises a sensor data input chiplet that obtains sensor data from a sensor system of a vehicle, and wherein the one or more processing chiplets include an autonomous drive chiplet, at least one general compute chiplet, and a machine learning accelerator chiplet to autonomously operate the vehicle.

10. A multiple-system-on-chip comprising:
a first system-on-chip; and
a second system-on-chip operatively connected to and in communication with the first system-on-chip via a chip-to-chip or die-to-die interconnect;
wherein the first system-on-chip and the second system-on-chip each comprise:
a data input chiplet to obtain data from one or more data sources;
one or more workload processing chiplets accessing the data obtained by the data input chiplet to execute respective workloads;
a central chiplet including a shared memory comprising a reservation table listing a plurality of workload entries, each respective workload entry corresponding to a specified workload to be executed by the one or more workload processing chiplets in a respective workload pipeline;
wherein the central chiplet inputs a thread number for each respective workload entry in
the reservation table, the thread number identifying a workload pipeline, from a set of workload pipelines executed by the one or more workload processing chiplets, in which the specified workload is to be executed; and
wherein the one or more workload processing chiplets executes respective workloads in the set of workload pipelines in parallel in accordance with the thread number in the reservation table for the specified workload.

11. The multiple-system-on-chip of claim 10, wherein the first system-on-chip operates in a primary role to execute the set of workload pipelines, and wherein the second system-on-chip operates in a backup role to perform health monitoring on the first system-on chip.

12. The multiple-system-on-chip of claim 10, wherein each workload entry, in a subset of workload entries of the plurality of workload entries, includes dependency information indicating workloads that must be executed before a workload corresponding to the workload entry can be executed.

13. The multiple-system-on-chip of claim 12, wherein the reservation table further updates the dependency information for each of the subset of workload entries as workloads are executed by the one or more workload processing chiplets in the set of workload pipelines.

14. The multiple-system-on-chip of claim 12, wherein the respective workload processing chiplet elects or groups the plurality of workload entries in the reservation table based on the thread number associated with each workload pipeline in the plurality of workload pipelines processed by the respective workload processing chiplet.

15. The multiple-system-on-chip of claim 14, wherein the respective workload processing chiplet further references the dependency information of workload entries in the reservation table having the thread number associated with each workload pipeline in the plurality of workload pipelines executed by the respective workload processing chiplet.

16. The multiple-system-on-chip of claim 15, wherein the respective workload processing chiplet executes select workloads in the plurality of workload pipelines when the dependency information for each of the select workloads is satisfied.

17. The multiple-system-on-chip of claim 12, wherein, when the dependency information for a particular workload entry has not been satisfied, a workload associated with the particular workload entry is buffered in an out-of-order buffer.

18. A method of preventing interference in executing workload pipelines, the method being performed by one or more processors of a monolithic chip and comprising:
obtaining, by the one or more processors, data from one or more data sources;
scheduling workloads in the plurality of independent workload pipelines to be executed in parallel by the one or more processors based on the obtained data by inputting a thread number for each respective workload entry of a plurality of workload entries in a reservation table stored in a shared memory of the monolithic chip, each respective workload entry corresponding to a specified workload to be executed in a respective workload pipeline;
wherein the thread number identifies a workload pipeline, from a set of workload pipelines executed by the one or more processors, in which the specified workload is to be executed;
executing the specified workload in the plurality of independent workload pipelines in parallel in accordance with the thread number in the reservation table for the specified workload.

* * * * *